US012669212B2

(12) United States Patent　　　　(10) Patent No.:　US 12,669,212 B2
Liu　　　　　　　　　　　　　　　　(45) Date of Patent:　　Jun. 30, 2026

(54) COMPACT TRIPOD

(71) Applicant: Coman Photo Equipment (Zhongshan) Co., Ltd., Zhongshan (CN)

(72) Inventor: Yao Liu, Zhuhai (CN)

(73) Assignee: Coman Photo Equipment (Zhongshan) Co., Ltd., Zhongshan City (CN)

( * ) Notice: Subject to any disclaimer, the term of this patent is extended or adjusted under 35 U.S.C. 154(b) by 421 days.

(21) Appl. No.: 18/576,474

(22) PCT Filed: Aug. 31, 2021

(86) PCT No.: PCT/CN2021/115484
§ 371 (c)(1),
(2) Date: Jan. 4, 2024

(87) PCT Pub. No.: WO2023/004920
PCT Pub. Date: Feb. 2, 2023

(65) Prior Publication Data
US 2024/0309990 A1　　Sep. 19, 2024

(30) Foreign Application Priority Data

Jul. 27, 2021　(CN) .......................... 202121728388.9

(51) Int. Cl.
*F16M 11/32*　　　　(2006.01)
(52) U.S. Cl.
CPC ................................... *F16M 11/32* (2013.01)
(58) Field of Classification Search
CPC ........ F16M 11/04; F16M 11/14; F16M 11/20; F16M 11/32; F16M 11/16; F16M 11/106
See application file for complete search history.

(56) References Cited

U.S. PATENT DOCUMENTS 3,958,904 A * 5/1976 Rusbach ................. F41A 27/08
　　　　　　　　　　　　　　　　　403/90
4,108,412 A * 8/1978 Miller .................... F16M 11/14
　　　　　　　　　　　　　　　　　248/187.1
(Continued)

FOREIGN PATENT DOCUMENTS

CN　　　201496081 U　　6/2010
CN　　　203857216 U　　10/2014
(Continued)

OTHER PUBLICATIONS

International Search Report of WO 2023/004920, mailed on Mar. 28, 2022.

*Primary Examiner* — Daniel J Wiley
(74) *Attorney, Agent, or Firm* — Wang Law Firm, Inc.

(57)　　　　　ABSTRACT

A compact tripod, comprising a clamping portion, a ball head, a buffer portion and an accommodating ball support portion; the buffer portion is pressed by the ball head and elastically abuts the clamping portion, thus gradually locking; the clamping portion and the ball head are combined to form a through-cavity from top to bottom; the accommodating ball support portion provides an accommodation cavity for the ball head, and the accommodating ball support portion is placed on a central support base; the central support base acts in concert with an arcuate outer wall of the accommodating ball support portion to provide a cup cavity; movable cooperation of the arcuate outer wall and cup cavity expands the adjustment incline angle of the clamping portion relative to the central support base. The tripod has the advantages of being simple and compact in structure, convenient to use and adjust, fast in operation, safe and reliable, aesthetically pleasing, etc.

8 Claims, 6 Drawing Sheets

(56) References Cited

U.S. PATENT DOCUMENTS

| | | | | |
|---|---|---|---|---|
| 4,936,811 | A * | 6/1990 | Baker | F16D 3/2055 |
| | | | | 277/637 |
| 8,025,262 | B2 * | 9/2011 | Yamaguchi | F16M 11/2014 |
| | | | | 248/176.1 |
| 9,464,753 | B2 * | 10/2016 | Mayer | G03B 17/561 |
| 11,248,737 | B2 * | 2/2022 | Ballentine | F16M 11/242 |
| 11,306,862 | B1 * | 4/2022 | Ye | F16M 11/14 |
| 11,940,087 | B2 * | 3/2024 | Pan | F16M 11/32 |
| 2005/0151036 | A1 * | 7/2005 | Speggiorin | F16M 11/32 |
| | | | | 248/177.1 |
| 2007/0090237 | A1 * | 4/2007 | Hsu | F16M 11/14 |
| | | | | 248/177.1 |
| 2007/0152115 | A1 * | 7/2007 | Chou | F16M 13/00 |
| | | | | 248/181.1 |
| 2016/0076583 | A1 * | 3/2016 | Karai | F16C 11/0609 |
| | | | | 248/278.1 |
| 2021/0190261 | A1 * | 6/2021 | Warner | F16M 11/16 |
| 2023/0349506 | A1 * | 11/2023 | Wilson | G03B 17/561 |
| 2024/0240747 | A1 * | 7/2024 | Warner | F16M 11/16 |
| 2025/0155071 | A1 * | 5/2025 | Liang | F16M 11/14 |

FOREIGN PATENT DOCUMENTS

| | | | |
|---|---|---|---|
| CN | 205618923 U | 10/2016 |
| CN | 207962018 U | 10/2018 |
| CN | 213271814 U | 5/2021 |

* cited by examiner

COMPACT TRIPOD

FIELD OF INVENTION

The present invention relates to a compact tripod design.

BACKGROUND OF THE INVENTION

After conducting market research and patent searches, it became apparent that conventional tripod locking mechanisms suffer from several shortcomings, including limited contact area, susceptibility to loosening during adjustment, inadequate adjustment accuracy, complicated locking structures, structural instability, and operational shortcomings during installation and use. In response to these issues, we undertook a comprehensive optimization of tripod design, resulting in the development of our innovative compact tripod solution.

SUMMARY OF THE INVENTION

The purpose of the present invention is to address a technical challenge by introducing a tripod that has, among other things, a straightforward and compact design, ease of operation and adjustment, swift functionality, safety, reliability, and an aesthetically pleasing appearance.

To achieve the foregoing purpose, an embodiment of the present invention employs a technical approach to provide a compact tripod comprising a clamping mechanism, a ball head, a buffer component, and a ball holder. The buffer component is elastically pressed against the clamping mechanism by the ball head, facilitating a progressive locking mechanism.

The ball holder provides a receiving chamber for the ball head and is positioned on a central support seat that features a concave recess designed to complement a curved outer surface of the ball holder. Through the dynamic interaction between the curved outer surface and the concave recess, the range of tilt angle adjustments of the clamping mechanism relative to the central support seat can be expanded.

In one or more embodiments of the present invention, the buffer component includes multiple deformable chambers designed to accommodate extrusion deformation to ensure a secure fit between the buffer component, the ball head, and the clamping mechanism.

In one or more embodiments of the present invention, the deformable chamber consists of both an upper deformable chamber and a lower deformable chamber that are strategically staggered and separated from each other. In addition, the upper deformable chamber has a greater depth than the lower deformable chamber.

In one or more embodiments of the present invention, the central support seat provides a concave recess designed to tightly receive and hold the outer surface of the ball holder.

In one or more embodiments of the present invention, the central support seat is movably connected to a leg, and the ball holder is configured as a U-shaped opening. The receiving chamber is in direct communication with this U-shaped opening and houses the ball head. The ball head extends from a lower rod that is mounted in an inner chuck. This inner chuck is equipped with a quick-clamper on one side, allowing the lower rod to be quickly converted between a clamped condition and a loosened adjustment condition with the aid of the quick-clamper.

In one or more embodiments of the present invention, the clamping mechanism incorporates the buffer component, consisting of an inner chamber and an outer ring. The outer ring is equipped with multiple raised pins, while the ball holder is provided with recessed embedding holes designed to accommodate these multiple raised pins. These pins precisely align with their corresponding embedding holes, ensuring a tight connection between the clamping mechanism and the ball holder.

In one or more embodiments of the present invention, the clamping mechanism and the ball head are combined to form a top-to-bottom access chamber. An internally threaded bolt is incorporated into the inner chuck with its upper end precisely aligned with the access chamber, thereby facilitating the threading of an intermediate rod.

In one or more embodiments of the present invention, the adjustable tilt angle ranges from 5 to 35 degrees.

The advantage of the present invention over the prior art is that:

By virtue of the above embodiment of the present invention, it offers the advantages of a straightforward and compact structure, swift functionality, user-friendly operation and adjustment, safety, reliability, and an aesthetically pleasing appearance. Consequently, it represents a solution with a high degree of technicality, industrial applicability, and economy.

Figure 1:
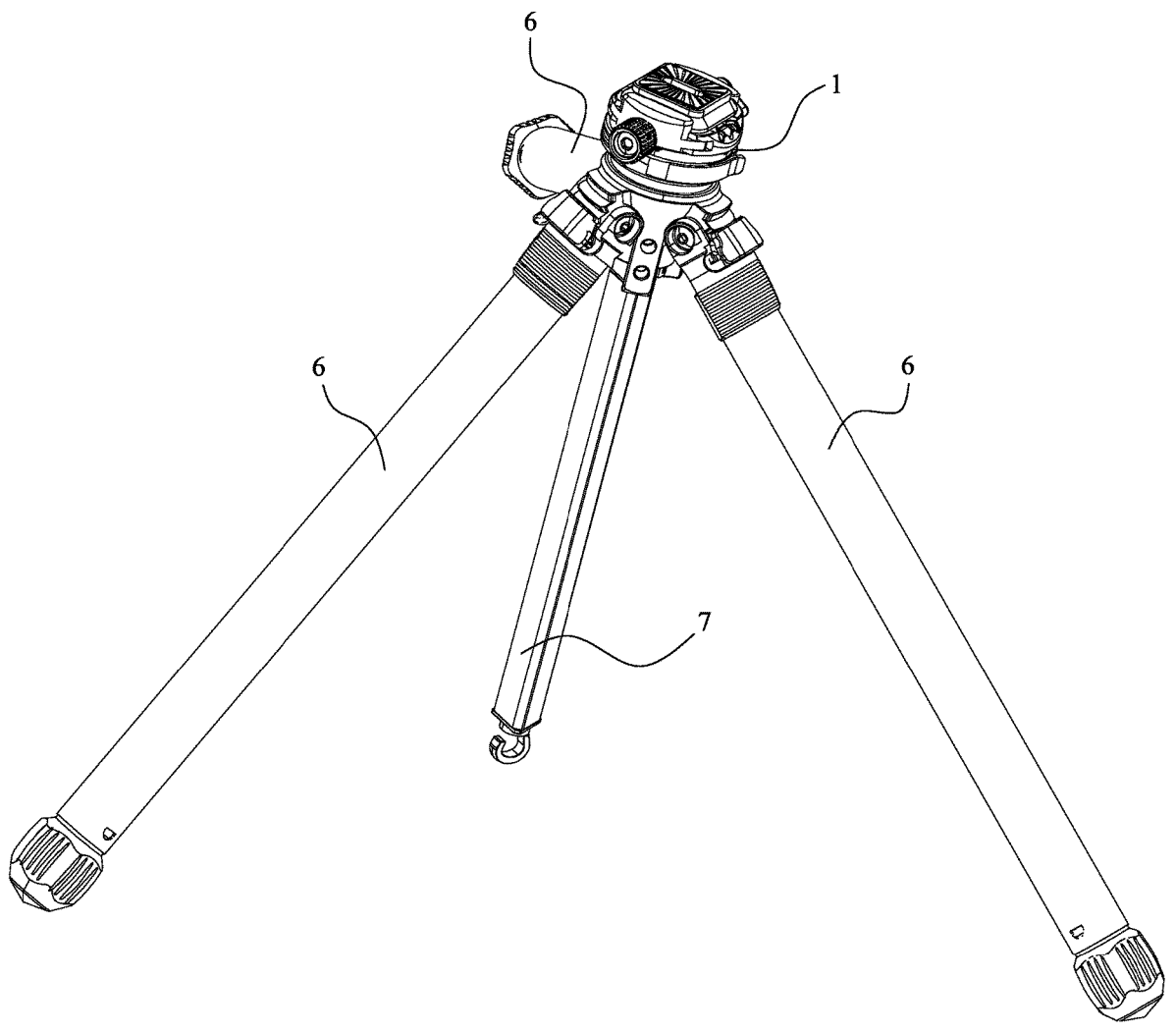
FIG. 1 is a schematic diagram of the three-dimensional structure of the tripod in an embodiment of the present invention.

Those skilled in the art will be able to visualize the shape and construction, and will understand the resulting solution from the accompanying drawings, wherein the various parts of the accompanying drawings are not necessarily to scale, and the dimensions of the various parts and components of the accompanying drawings may be enlarged or reduced to more clearly illustrate the embodiments of the present invention described herein.

DETAILED DESCRIPTION OF THE PREFERRED EMBODIMENTS

The following is a detailed description of embodiments of the present invention, examples of which are illustrated in the accompanying drawings, wherein the same or similar reference numbers throughout denote the same or similar elements or elements having the same or similar functions.

The orientation shown in the accompanying drawings is not to be construed as limiting the specific scope of protection of the present invention and is only for reference and understanding of the preferred embodiment, which may be varied in position, increased in number, or simplified in structure by the product components shown in the drawings.

The "connection" described in the specification and the "connection" of the parts shown in the accompanying drawings can be understood as a fixed connection, a detachable connection, or a connection forming a single piece; it can be a direct connection or a connection through an intermediate medium, and a person skilled in the art can understand the connection relationship according to the specific conditions and can conclude that screwing, riveting, welding, snapping or inserting and the like can be suitably substituted in different implementations.

The orientation terms such as up, down, left, right, top, bottom, etc. described in the specification and the orientation shown in the accompanying drawings, the parts can be directly contacted or contacted by another feature between them; such as in the top can be directly above and diagonally above, or it only indicates higher than the other objects; this is also applicable to be understood by analogy for the other orientations. In the following, the accompanying drawings of the specification are combined to make the technical solution of the present invention and its beneficial effects clearer and more explicit by further describing the specific embodiment of the present invention.

Figure 2:
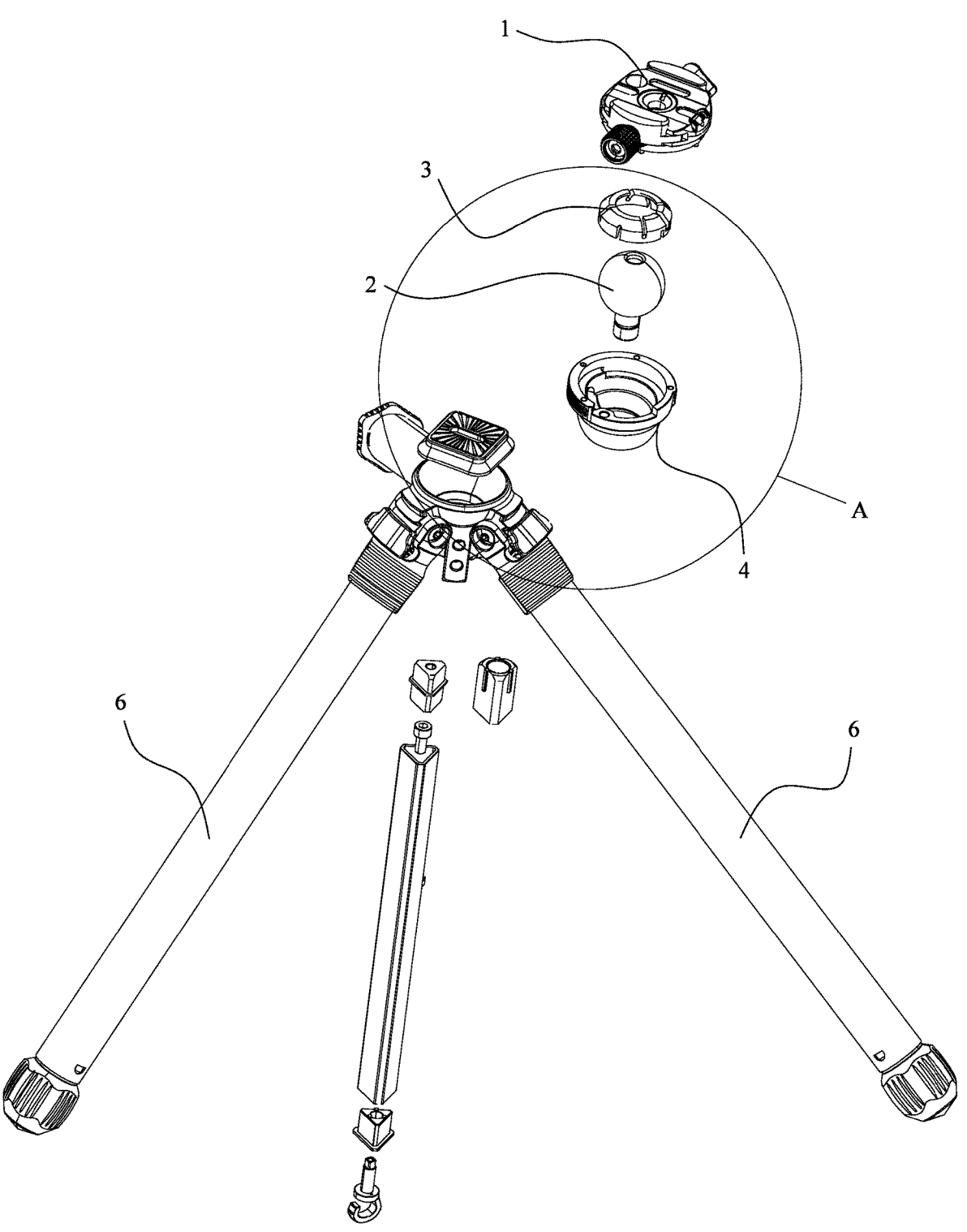
FIG. 2 is a schematic diagram of the structure of the tripod in an embodiment of the present invention in an unfolded state.
Figure 3:
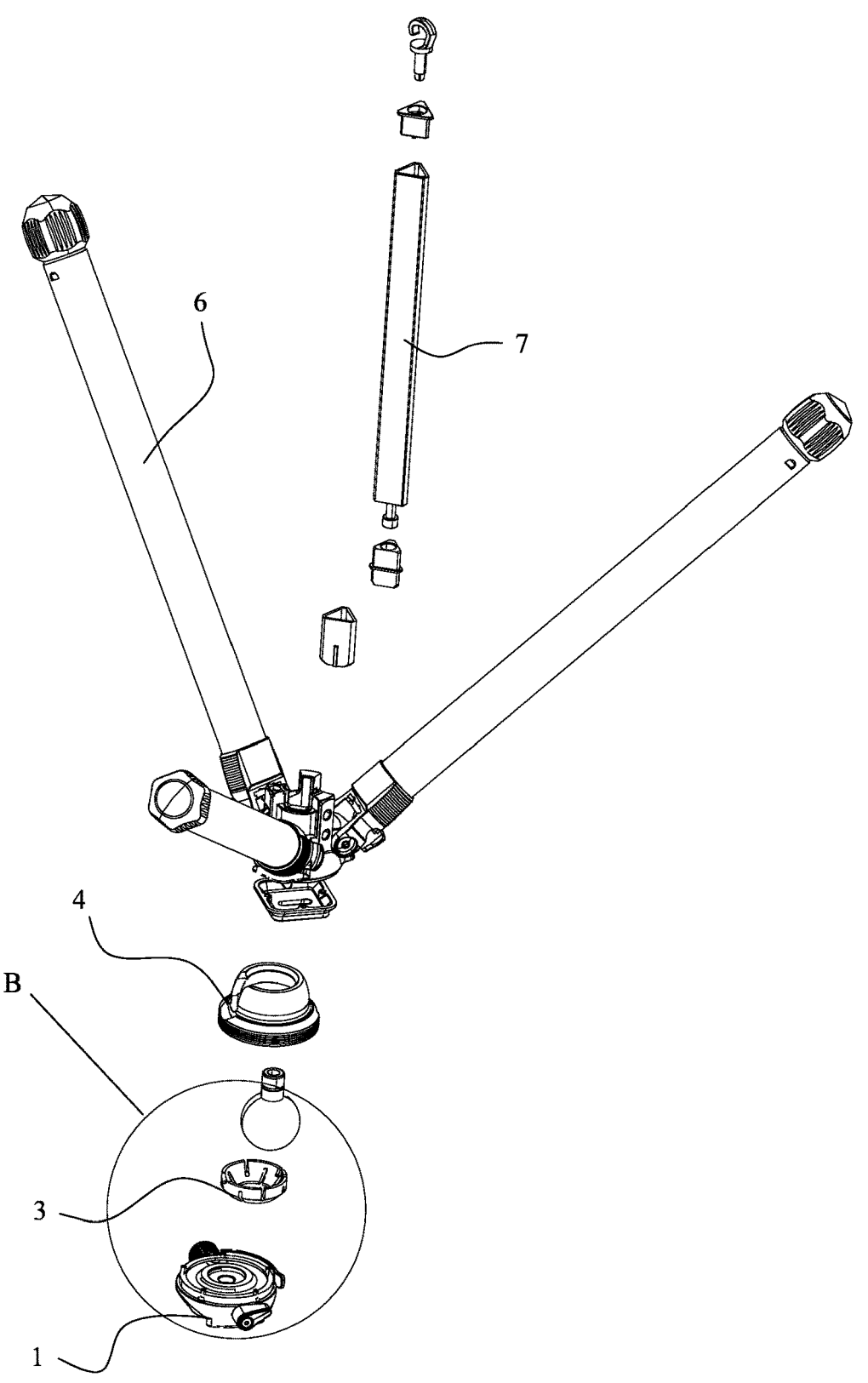
FIG. 3 is a schematic diagram of the structure of the tripod in an embodiment of the present invention in an unfolded state from another angle of view.
Figure 4:
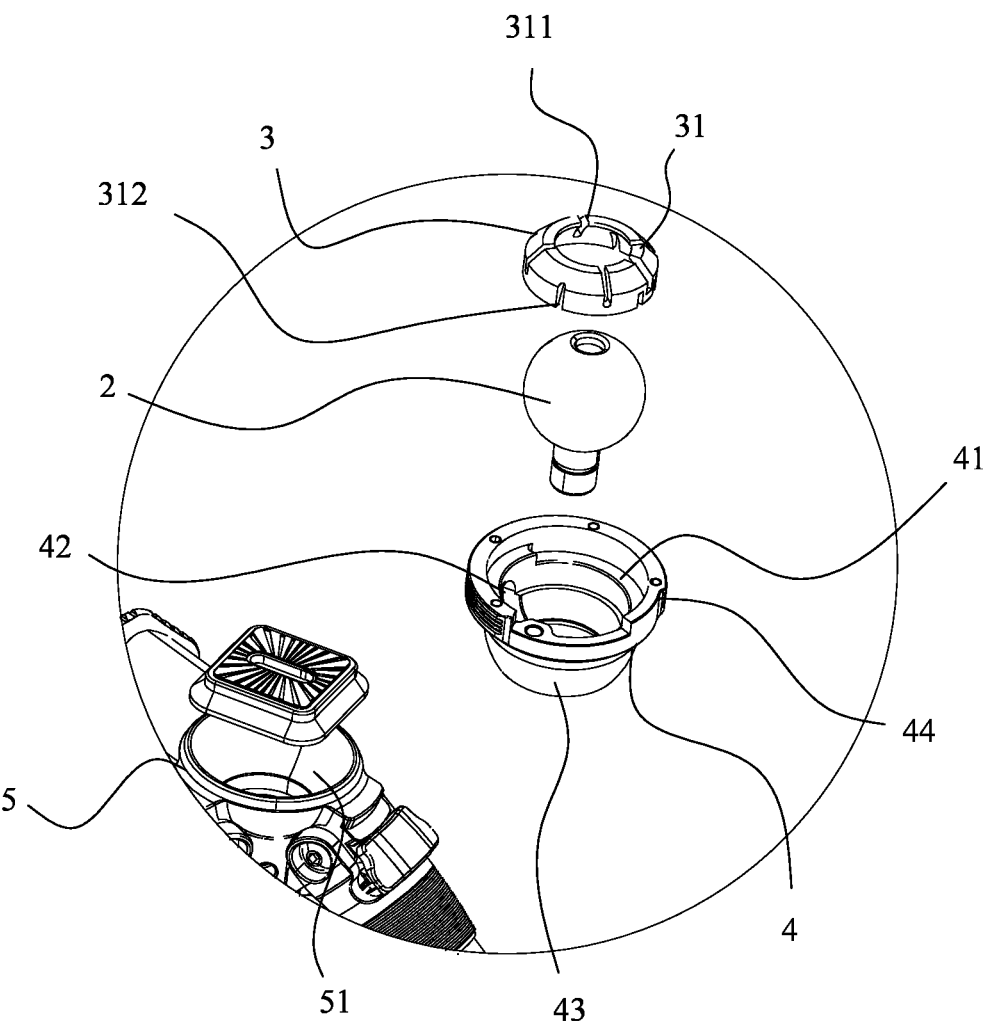
FIG. 4 is an enlarged view of A in FIG. 2.
Figure 5:
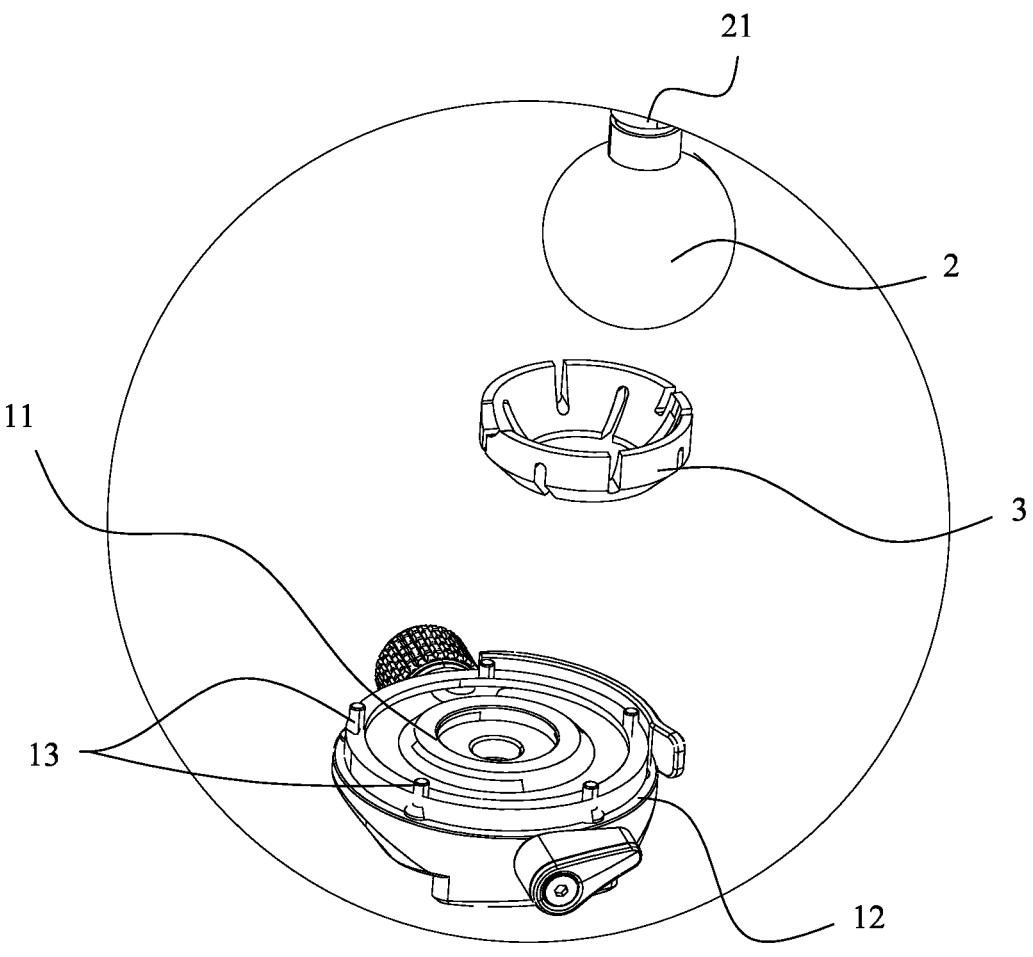
FIG. 5 is an enlarged view of B in FIG. 3.
Figure 6:
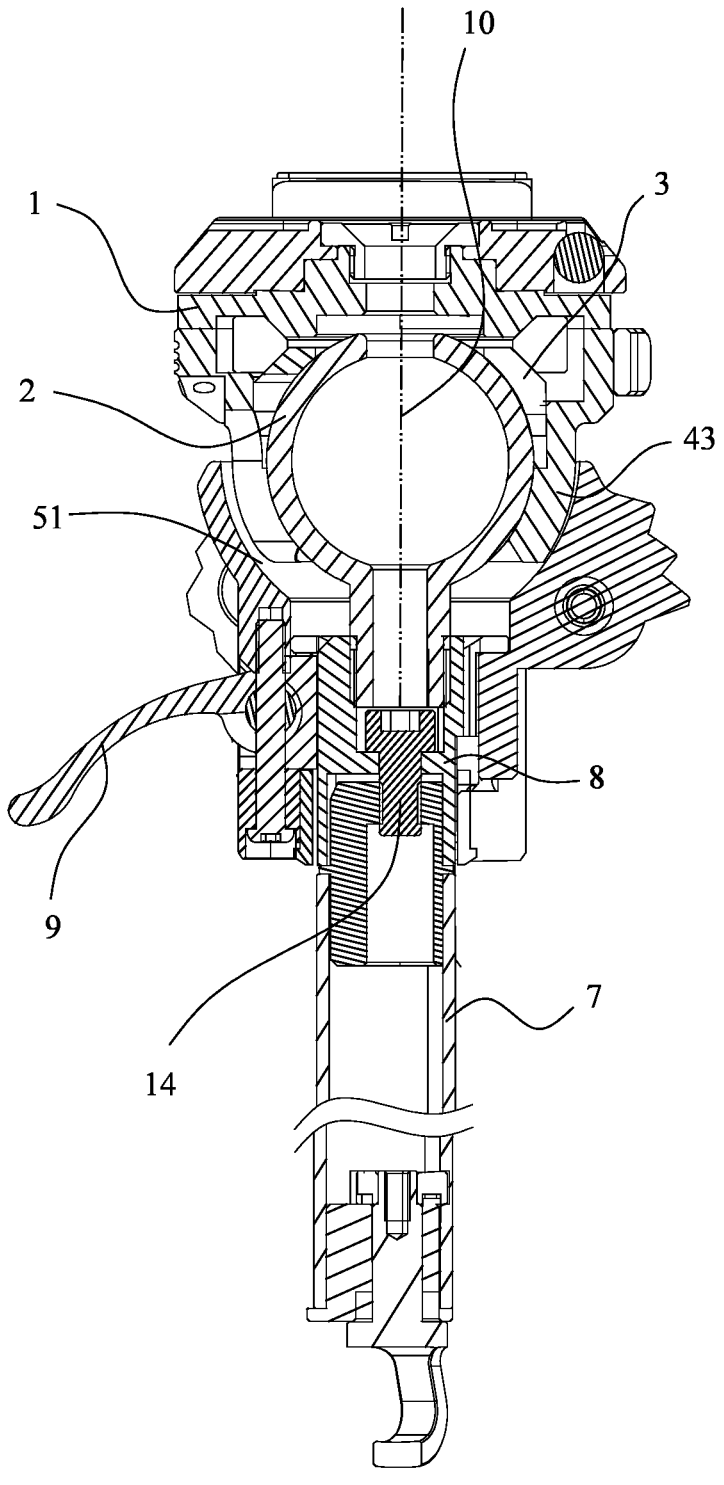
FIG. 6 is a schematic diagram of a sectional structure of the tripod in an embodiment of the present invention.

The specific embodiments will be described below with reference to FIGS. 1-6. However, it will be readily understood by those skilled in the art that the detailed description given herein with reference to these accompanying drawings is for illustrative purposes only and should not be construed as limiting, such as that the present invention provides a preferred embodiment of a tripod comprising a clamping mechanism 1, a ball head 2, a buffer component 3, and a ball holder 4.

The ball holder 4 provides a receiving chamber 41 for receiving the ball head 2 and is positioned on a central support seat 5 that features a concave recess 51 designed to complement a curved outer surface 43 of the ball holder 4. Through the dynamic interaction between the curved outer surface 43 and the concave recess 51, the range of tilt angle adjustments of the clamping mechanism 1 relative to the central support seat 5 can be expanded.

The adjustable tilt angle ranges from 5 to 35 degrees.

The buffer component 3 is elastically pressed against clamping mechanism 1 by the ball head 2, facilitating a progressive locking mechanism, and the buffer component 3 includes multiple deformable chambers 31 designed to accommodate extrusion deformation to ensure a secure fit between the buffer component 3, the ball head 2, and the clamping mechanism 1.

The deformable chamber 31 consists of both an upper deformable chamber 311 and a lower deformable chamber 312 that are strategically staggered and separated from each other; the upper and lower deformable chambers are provided to facilitate a better fit during loosening and tightening. More specifically, the upper deformable chamber 311 has a greater depth than the lower deformable chamber 312, and the upper deformable chamber 311 is formed on the inclined surface of the buffer component 3.

The central support seat 5 is movably connected to a leg 6, and the clamping mechanism 1 incorporates the buffer component 3, consisting of an inner chamber 11 and an outer ring 12, wherein the outer ring 12 is equipped with multiple raised pins 13, while the ball holder 4 is provided with recessed embedding holes 44 designed to accommodate these multiple raised pins 13. These pins 13 precisely align with their corresponding embedding holes 44, ensuring a tight connection between the clamping mechanism 1 and the ball holder 4.

The ball holder 4 is configured as a U-shaped opening 42, and the receiving chamber 41 is in direct communication with this U-shaped opening 42. The ball head 2 extends from a lower rod 21 that is mounted in an inner chuck 8, wherein the inner chuck 8 is equipped with a quick-clamper 9 on one side, allowing the ball head 2 to be converted between a clamped condition and a loosened adjustment condition with the aid of the quick-clamper 9, which facilitates the operation with a simple structure.

The clamping mechanism 1 and the ball head 2 are combined to form a top-to-bottom access chamber 10. When an intermediate rod 7 is mounted for threading, an internally threaded bolt 14 is incorporated into the inner chuck 8 with its upper end precisely aligned with the access chamber 10, thereby facilitating the operation of threading the intermediate rod 7.

For purposes of illustration, the foregoing description uses specific designations to provide a thorough understanding of the described embodiments. However, it will be apparent to those skilled in the art that specific details are not necessary in the practice of the described embodiments. It should be understood by those skilled in the art that the present invention is not limited to the specific embodiments described above, and that all improvements and substitutions based on the present invention using techniques known in the art are within the scope of the present invention and should be limited by the respective claims.

What is claimed is:

1. A tripod, is characterized in that it comprises a clamping mechanism, a ball head, a buffer component, and a ball holder; the buffer component is elastically pressed against the clamping mechanism by the ball head to facilitate a progressive locking mechanism;

the ball holder provides a receiving chamber for the ball head and is positioned on a central support seat having a concave recess designed to complement a curved outer surface of the ball holder; through the dynamic interaction between the curved outer surface and the concave recess, the range of tilt angle adjustments of the clamping mechanism relative to the central support seat is expanded.

2. The tripod according to claim 1, is characterized in that: the buffer component includes multiple deformable chambers designed to accommodate extrusion deformation to ensure a secure fit between the buffer component, the ball head, and the clamping mechanism.

3. The tripod according to claim 2, is characterized in that: the deformable chamber consists of both an upper deformable chamber and a lower deformable chamber that are strategically staggered and separated from each other, and the upper deformable chamber has a greater depth than the lower deformable chamber.

4. The tripod according to claim 1, is characterized in that: the central support seat provides a concave recess designed to tightly receive and hold the outer surface of the ball holder.

5. The tripod according to claim 4, is characterized in that: the central support seat is movably connected to a leg, and the ball holder is configured as a U-shaped opening; the receiving chamber is in direct communication with this U-shaped opening and houses the ball head; the ball head extends from a lower rod that is mounted in an inner chuck; the inner chuck is equipped with a quick-clamper on one side, allowing the lower rod to be quickly converted between a clamped condition and a loosened adjustment condition with the aid of the quick-clamper.

6. The tripod according to claim 4, is characterized in that: the clamping mechanism incorporates the buffer component, consisting of an inner chamber and an outer ring; the outer ring is equipped with multiple raised pins, while the ball holder is provided with recessed embedding holes designed to accommodate these multiple raised pins; these pins precisely align with their corresponding embedding holes, ensuring a tight connection between the clamping mechanism and the ball holder.

7. The tripod according to claim 4, is characterized in that: the clamping mechanism and the ball head are combined to form a top-to-bottom access chamber; an internally threaded bolt is incorporated into the inner chuck with its upper end precisely aligned with the access chamber, thereby facilitating the threading of an intermediate rod.

8. The tripod according to claim 4, is characterized in that: the adjustable tilt angle ranges from 5 to 35 degrees.

\* \* \* \* \*